United States Patent
Nguyen et al.

(10) Patent No.: US 12,425,086 B2
(45) Date of Patent: Sep. 23, 2025

(54) PHASE-TIMING CALIBRATION ALGORITHM FOR DISTRIBUTED MIMO USING CSI-RS RESOURCES

(71) Applicant: Samsung Electronics Co., Ltd., Suwon-si (KR)

(72) Inventors: Thuy Van Nguyen, Plano, TX (US); Yang Li, Plano, TX (US); R A Nadisanka Perera Rupasinghe, McKinney, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/603,107

(22) Filed: Mar. 12, 2024

(65) Prior Publication Data

US 2024/0429982 A1 Dec. 26, 2024

Related U.S. Application Data

(60) Provisional application No. 63/522,059, filed on Jun. 20, 2023.

(51) Int. Cl.
| | |
|---|---|
| *H04B 7/06* | (2006.01) |
| *H04B 17/12* | (2015.01) |
| *H04B 17/21* | (2015.01) |

(52) U.S. Cl.
CPC ......... *H04B 7/0626* (2013.01); *H04B 17/12* (2015.01); *H04B 17/221* (2023.05)

(58) Field of Classification Search
CPC ..... H04B 7/0626; H04B 17/12; H04B 17/221
See application file for complete search history.

(56) References Cited

U.S. PATENT DOCUMENTS

| | | |
|---|---|---|
| 10,305,537 B2 | 5/2019 | Fan et al. |
| 2015/0055503 A1 | 2/2015 | Xia et al. |

(Continued)

FOREIGN PATENT DOCUMENTS

| | | |
|---|---|---|
| CN | 107645770 A | 1/2018 |
| JP | 2021016138 A | 2/2021 |
| WO | 2023146440 A1 | 8/2023 |

OTHER PUBLICATIONS

"3rd Generation Partnership Project; Technical Specification Group Radio Access Network; Evolved Universal Terrestrial Radio Access (E-UTRA); Physical channels and modulation (Release 16)", 3GPP TS 36.211 V16.4.0, Dec. 2020, 249 pages.

(Continued)

*Primary Examiner* — Jaison Joseph

(57) ABSTRACT

A method performed by a network entity includes determining a target timing mismatch for a phase timing slope between first and second channel state information-reference signal (CSI-RS) resources, and determining, based on the target timing mismatch, a first band separation between a first calibrated phase for the first the second CSI-RS resource and a second calibrated phase for the first and the second CSI-RS resource. The method further includes determining a first frequency band for the first calibrated phase, and determining, based on the band separation, a second frequency band for the second calibrated phase. The method further includes determining, based on the band separation between the first calibrated phase the second calibrated phase, a first phase timing slope between the first the second CSI-RS resource, and performing joint transmission from a first TRP and a second TRP based on the first phase timing slope.

20 Claims, 13 Drawing Sheets

(56) References Cited

U.S. PATENT DOCUMENTS

| | | | |
|---|---|---|---|
| 2019/0174535 | A1 | 6/2019 | Li et al. |
| 2021/0204295 | A1 | 7/2021 | Chen |
| 2021/0282111 | A1 | 9/2021 | Yamada et al. |
| 2022/0094516 | A1 | 3/2022 | Zhang et al. |
| 2022/0123977 | A1* | 4/2022 | Jiang .................. H04L 27/2656 |
| 2022/0263633 | A1* | 8/2022 | Rahman ................ H04B 7/024 |
| 2022/0385516 | A1 | 12/2022 | Atungsiri et al. |
| 2022/0416862 | A1* | 12/2022 | Long ........................ H04B 7/10 |
| 2023/0180177 | A1* | 6/2023 | Manolakos ........... H04L 5/0051 |
| 2024/0333358 | A1* | 10/2024 | Rupasinghe ............ H04B 7/10 |
| 2024/0388343 | A1* | 11/2024 | Lee ...................... H04B 7/0626 |
| 2024/0421858 | A1* | 12/2024 | Nguyen ................ H04B 7/024 |

OTHER PUBLICATIONS

"3rd Generation Partnership Project; Technical Specification Group Radio Access Network; Evolved Universal Terrestrial Radio Access (E-UTRA); Multiplexing and channel coding (Release 16)", 3GPP TS 36.212 V16.4.0, Dec. 2020, 254 pages.

"LTE; Evolved Universal Terrestrial Radio Access (E-UTRA) Physical layer procedures (3GPP TS 36.213 version 16.4.0 Release 16)", ETSI TS 136 213 V16.4.0, Feb. 2021, 577 pages.

"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.3.0, Dec. 2020, 142 pages.

"LTE; Evolved Universal Terrestrial Radio Access (E-UTRA); Radio Resource Control (RRC); Protocol specification (3GPP TS 36.331 version 16.3.0 Release 16)", ETSI TS 136 331 V16.3.0, Jan. 2021, 1089 pages.

"3rd Generation Partnership Project; Technical Specification Group Radio Access Network; NR; Physical channels and modulation (Release 16)", 3GPP TS 38.211 v16.4.0, Dec. 2020, 133 pages.

"3rd Generation Partnership Project; Technical Specification Group Radio Access Network; NR; Multiplexing and channel coding (Release 16)", 3GPP TS 38.212 v16.4.0, Dec. 2020, 152 pages.

"3rd Generation Partnership Project; Technical Specification Group Radio Access Network; NR; Physical layer procedures for control (Release 16)", 3GPP TS 38.213 v16.4.0, Dec. 2020, 181 pages.

"3rd Generation Partnership Project; Technical Specification Group Radio Access Network; NR; Physical layer procedures for data (Release 16)", 3GPP TS 38.214 v16.4.0, Dec. 2020, 169 pages.

"5G; NR; Physical layer measurements (3GPP TS 38.215 version 16.4.0 Release 16)", ETSI TS 138 215 V16.4.0, Jan. 2021, 31 pages.

"3rd Generation Partnership Project; Technical Specification Group Radio Access Network; NR; Medium Access Control (MAC) protocol specification (Release 16)", 3GPP TS 38.321 v16.3.0, Dec. 2020, 156 pages.

"3rd Generation Partnership Project; Technical Specification Group Radio Access Network; NR; Radio Resource Control (RRC) protocol specification (Release 16)", 3GPP TS 38.331 v16.3.1, Jan. 2021, 932 pages.

International Search Report and Written Opinion issued Sep. 20, 2024 regarding International Application No. PCT/KR2024/008445, 7 pages.

Vivo, "Maintenance on MTRP CSI and partial reciprocity", 3GPP TSG RAN WG1 #108-e, R1-2201084, Feb. 2022, 16 pages.

\* cited by examiner

PHASE-TIMING CALIBRATION ALGORITHM FOR DISTRIBUTED MIMO USING CSI-RS RESOURCES

CROSS-REFERENCE TO RELATED APPLICATION(S) AND CLAIM OF PRIORITY

This application claims priority under 35 U.S.C. § 119(e) to U.S. Provisional Patent Application No. 63/522,059 filed on Jun. 20, 2023. The above-identified provisional patent application is hereby incorporated by reference in its entirety.

TECHNICAL FIELD

This disclosure relates generally to wireless networks. More specifically, this disclosure relates to methods and apparatuses for phase-timing calibration for distributed MIMO using CSI-RS resources.

BACKGROUND

The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure provides methods and apparatuses for phase-timing calibration for distributed MIMO using CSI-RS resources.

In one embodiment, a network entity is provided. The network entity includes a memory, and a processor operably coupled to the memory. The processor is configured to determine a target timing mismatch for a phase timing slope between a first channel state information-reference signal (CSI-RS) resource and a second CSI-RS resource, and determine, based on the target timing mismatch, a first band separation between a first calibrated phase for the first CSI-RS resource and the second CSI-RS resource and a second calibrated phase for the first CSI-RS resource and the second CSI-RS resource. The processor is further configured to determine a first frequency band for the first calibrated phase, and determine, based on the band separation, a second frequency band for the second calibrated phase. The processor is further configured to determine, based on the band separation between the first calibrated phase the second calibrated phase, a first phase timing slope between the first CSI-RS resource and the second CSI-RS resource, and perform joint transmission from a first transmit-receive point (TRP) and a second TRP based on the first phase timing slope.

In another embodiment, a method performed by a network entity is provided. The method includes determining a target timing mismatch for a phase timing slope between a first CSI-RS resource and a second CSI-RS resource, and determining, based on the target timing mismatch, a first band separation between a first calibrated phase for the first CSI-RS resource and the second CSI-RS resource and a second calibrated phase for the first CSI-RS resource and the second CSI-RS resource. The method further includes determining a first frequency band for the first calibrated phase, and determining, based on the band separation, a second frequency band for the second calibrated phase. The method further includes determining, based on the band separation between the first calibrated phase the second calibrated phase, a first phase timing slope between the first CSI-RS resource and the second CSI-RS resource, and performing joint transmission from a TRP and a second TRP based on the first phase timing slope.

In yet another embodiment, a non-transitory computer readable medium embodying a computer program is provided. The computer program includes program code that, when executed by a processor of a device, causes the device to determine a target timing mismatch for a phase timing slope between a first CSI-RS resource and a second CSI-RS resource, and determine, based on the target timing mismatch, a first band separation between a first calibrated phase for the first CSI-RS resource and the second CSI-RS resource and a second calibrated phase for the first CSI-RS resource and the second CSI-RS resource. The computer program further includes program code that, when executed by a processor of a device, causes the device to determine a first frequency band for the first calibrated phase, and determine, based on the band separation, a second frequency band for the second calibrated phase. The computer program further includes program code that, when executed by a processor of a device, causes the device to determine, based on the band separation between the first calibrated phase the second calibrated phase, a first phase timing slope between the first CSI-RS resource and the second CSI-RS resource, and perform joint transmission from a first TRP and a second TRP based on the first phase timing slope.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
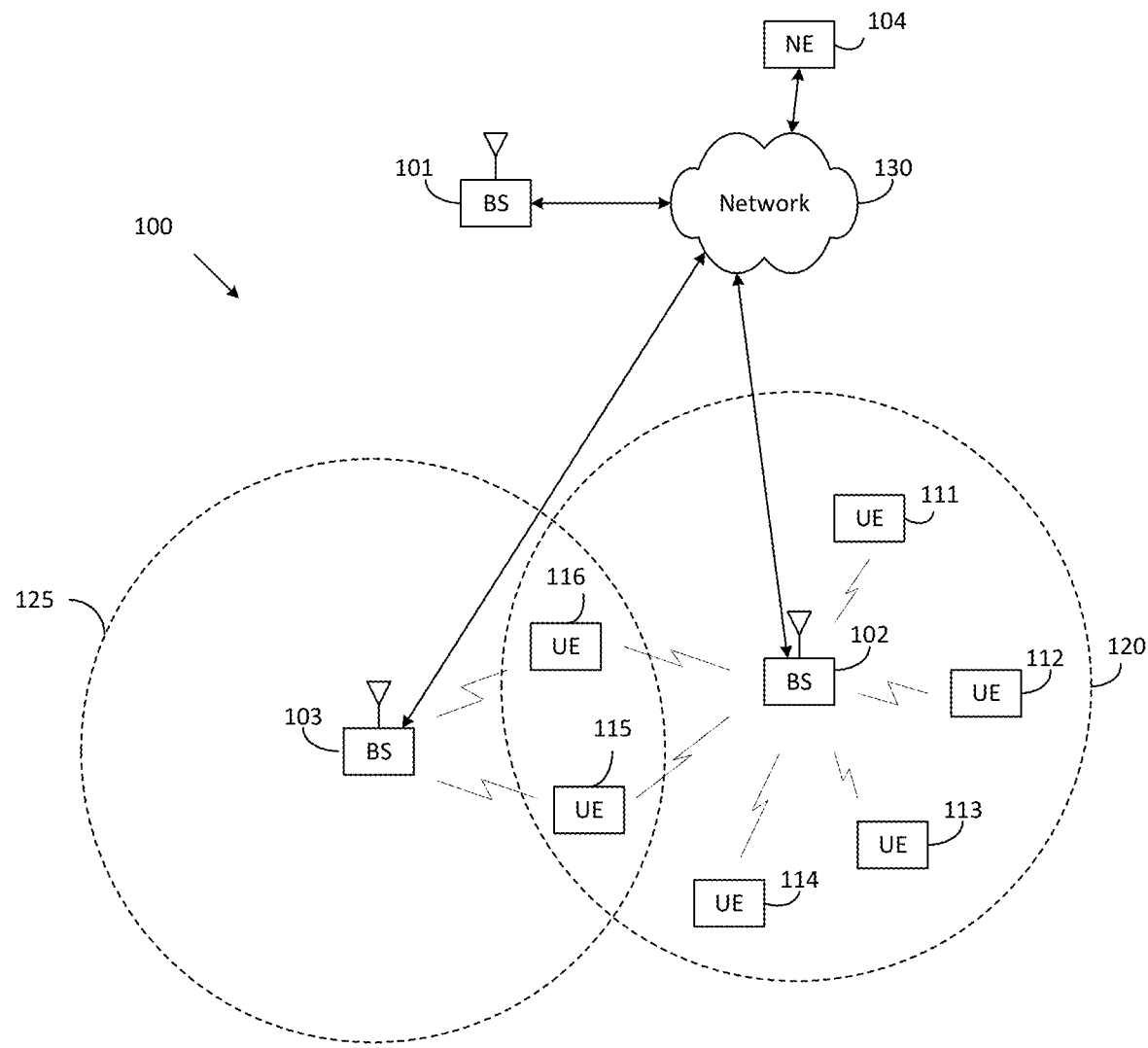
FIG. 1 illustrates an example wireless network according to embodiments of the present disclosure.

FIGS. 1 through 13, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

The following documents and standards descriptions are hereby incorporated by reference into the present disclosure as if fully set forth herein:

[1] 3GPP TS 36.211 v16.4.0, "E-UTRA, Physical channels and modulation."

[2] 3GPP TS 36.212 v16.4.0, "E-UTRA, Multiplexing and Channel coding."

[3] 3GPP TS 36.213 v16.4.0, "E-UTRA, Physical Layer Procedures."

[4] 3GPP TS 36.321 v16.3.0, "E-UTRA, Medium Access Control (MAC) protocol specification."

[5] 3GPP TS 36.331 v16.3.0, "E-UTRA, Radio Resource Control (RRC) Protocol Specification."

[6] 3GPP TS 38.211 v16.4.0, "NR, Physical channels and modulation."

[7] 3GPP TS 38.212 v16.4.0, "NR, Multiplexing and Channel coding."
[8] 3GPP TS 38.213 v16.4.0, "NR, Physical Layer Procedures for Control."
[9] 3GPP TS 38.214 v16.4.0, "NR, Physical Layer Procedures for Data."
[10] 3GPP TS 38.215 v16.4.0, "NR, Physical Layer Measurements."
[11] 3GPP TS 38.321 v16.3.0, "NR, Medium Access Control (MAC) protocol specification."
[12] 3GPP TS 38.331 v16.3.1, "NR, Radio Resource Control (RRC) Protocol Specification."

FIGS. 1-4 below describe various embodiments implemented in wireless communications systems and with the use of orthogonal frequency division multiplexing (OFDM) or orthogonal frequency division multiple access (OFDMA) communication techniques. The descriptions of FIGS. 1-4 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the network entity (NE) 104, the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 and NE 104 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the LUE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for LUE assisted on-demand robust phase calibration for distributed MIMO based on multi-port CSI-RS PMI feedback. In certain embodiments, network entity 104 includes circuitry, programming, or a combination thereof, to support UE assisted on-demand robust phase calibration for distributed MIMO based on multi-port CSI-RS PMI feedback. In certain embodiments, one or more of the gNBs 101-103 includes circuitry, programing, or a combination thereof, to support UE assisted on-demand robust phase calibration for distributed MIMO based on multi-port CSI-RS PMI feedback in a wireless communication system.

Although FIG. 1 illustrates one example of a wireless network, various changes may be made to FIG. 1. For example, the wireless network could include any number of gNBs, network entities, and any number of UEs in any suitable arrangement. Also, the gNB 101 could communicate directly with any number of UEs and provide those UEs with wireless broadband access to the network 130. Similarly, each gNB 102-103 could communicate directly with the network 130 and network entity 104 and provide UEs with direct wireless broadband access to the network 130. Further, the gNBs 101, 102, and/or 103 and/or network entity 104 could provide access to other or additional external networks, such as external telephone networks or other types of data networks.

Figure 2:
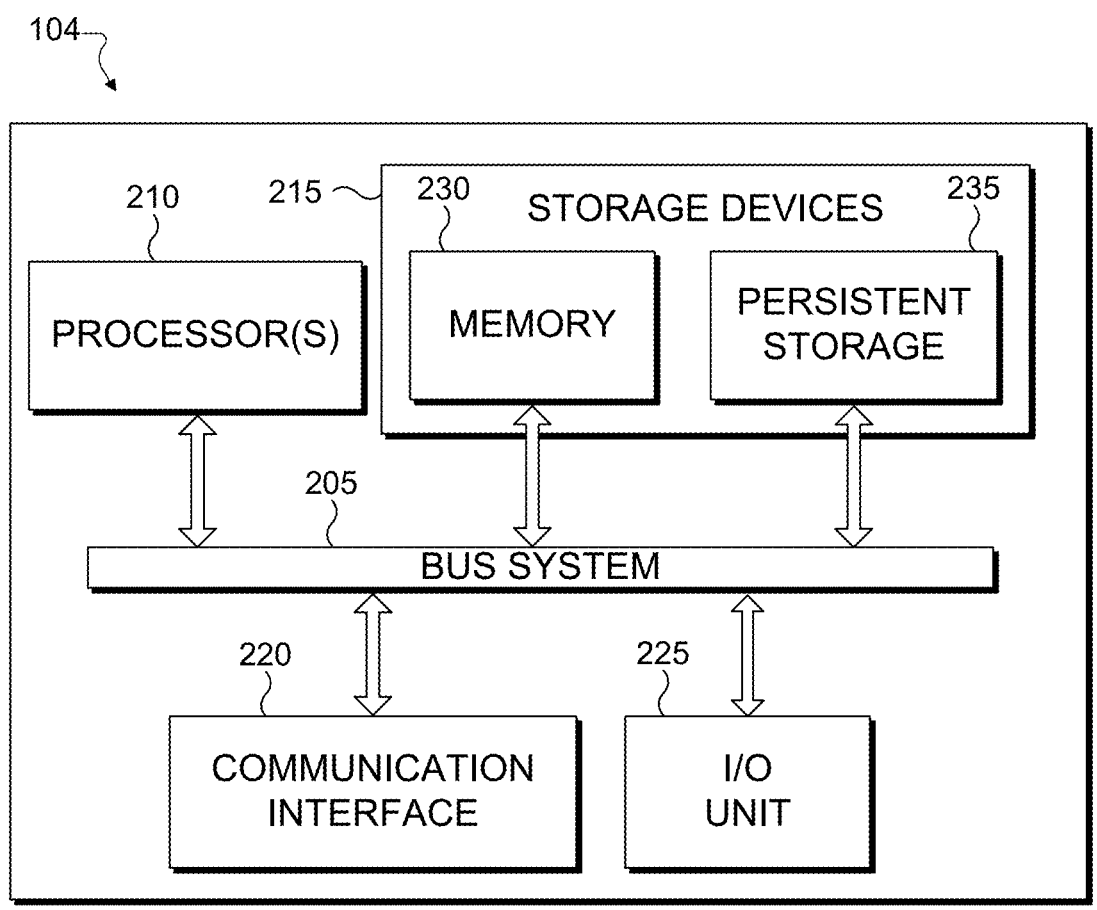
FIG. 2 illustrates an example network entity according to embodiments of the present disclosure.

FIG. 2 illustrates an example network entity (NE) 104 according to embodiments of the present disclosure. The embodiment of the NE 104 illustrated in FIG. 2 is for illustration only. However, NEs come in a wide variety of configurations, and FIG. 2 does not limit the scope of this disclosure to any particular implementation of an NE.

The network entity 104 can represent one or more local computing resources, remote computing resources, clustered computing resources, components that act as a single pool of seamless computing resources, a cloud-based computing resource, a virtualized computing resource, and the like. The network entity 104 can be accessed by one or more of the gNBs 101-103 and UEs 111-116 of FIG. 1 or another network entity.

As shown in FIG. 2, the network entity 104 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can execute processes to support UE assisted on-demand robust phase calibration for distributed MIMO based on multi-port CSI-RS PMI feedback.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for supporting phase and timing mis-match calibration in distributed MIMO. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit operation instructions to another device such as one of gNBs 101, 102, and 103.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the network entity 104 occur via a network connection.

While the various components of network entity 104 are illustrated as discrete components such as processor 210, memory 230, and communications interface 220, all components or a subset of components of network entity 104 may be implemented as virtual components in a virtual resource, such as a virtual machine, a virtual server, software emulation, hardware emulation, and the like. In some embodiments, network entity 104 may be a virtual resource. In some embodiments, network entity 104 may be implemented entirely as computer program code operating on a separate apparatus.

In some circumstances, network entity 104 may be integrated into another apparatus. For example, network entity 104 may be integrated into gNB 102. For instance, gNB 102 may include hardware that performs the functions of network entity 104, may include virtual resources that perform the functions of network entity 104, may include software that performs the functions of network entity 104, and/or gNB 102 may perform the functions of network entity 104 as an inherent feature of gNB 102.

In some circumstances, a network entity may be implemented across multiple apparatuses. For example, network entity 104 may be implemented across gNB 102 and gNB 103 such that gNB 102 and gNB 103 form a single network entity 104.

Note that while FIG. 2 is described as representing the network entity 104 of FIG. 1, the same or similar structure could be used in one or more of the gNBs 101, 102, and 103.

Although FIG. 2 illustrates an example network entity, various changes can be made to FIG. 2. For example, various components in FIG. 2 could be combined, further subdivided, or omitted and additional components could be added according to particular needs. As a particular example, the processor 210 could be divided into multiple processors, such as one or more central processing units (CPUs).

Figure 3:
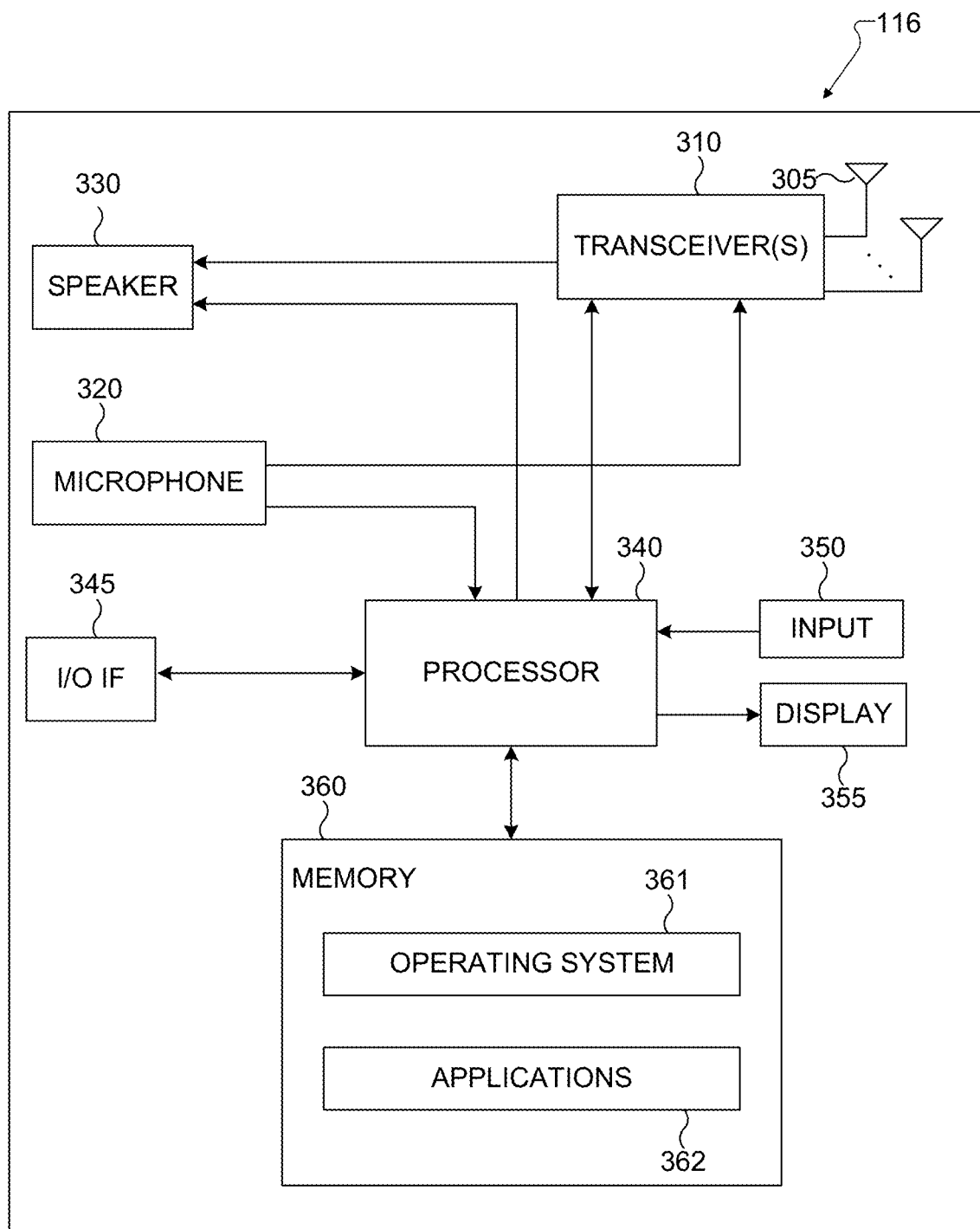
FIG. 3 illustrates an example UE according to embodiments of the present disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, for example, processes for UE assisted on-demand robust phase calibration for distributed MIMO based on multi-port CSI-RS PMI feedback as discussed in greater detail below. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
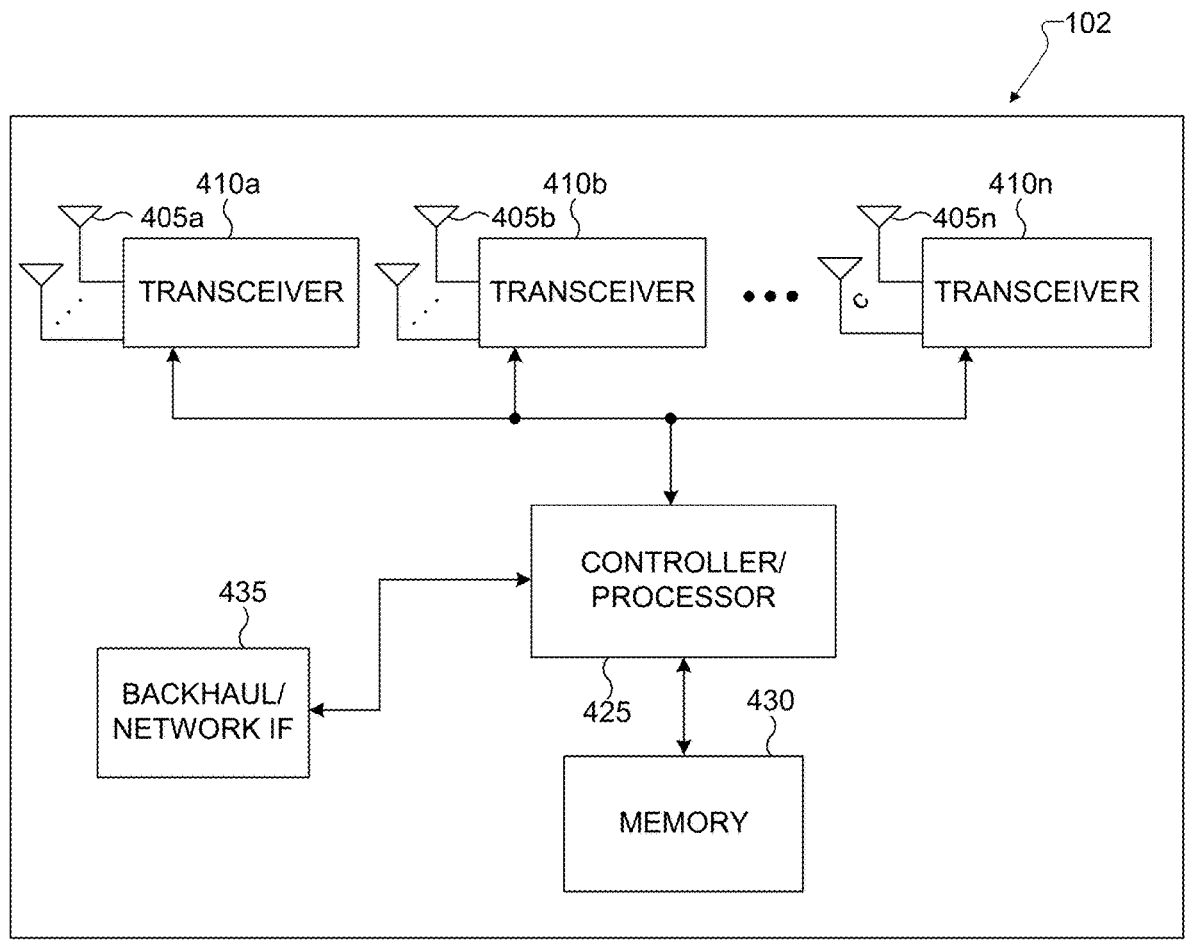
FIG. 4 illustrates an example gNB according to embodiments of the present disclosure.

FIG. 4 illustrates an example gNB 102 according to embodiments of the present disclosure. The embodiment of the gNB 102 illustrated in FIG. 4 is for illustration only, and the gNBs 101 and 103 of FIG. 1 could have the same or similar configuration. However, gNBs come in a wide variety of configurations, and FIG. 4 does not limit the scope of this disclosure to any particular implementation of a gNB.

As shown in FIG. 4, the gNB 102 includes multiple antennas 405a-405n, multiple transceivers 410a-410n, a controller/processor 425, a memory 430, and a backhaul or network interface 435.

The transceivers 410a-410n receive, from the antennas 405a-405n, incoming RF signals, such as signals transmitted by UEs in the network 100. The transceivers 410a-410n down-convert the incoming RF signals to generate IF or baseband signals. The IF or baseband signals are processed by receive (RX) processing circuitry in the transceivers 410a-410n and/or controller/processor 425, which generates processed baseband signals by filtering, decoding, and/or digitizing the baseband or IF signals. The controller/processor 425 may further process the baseband signals.

Transmit (TX) processing circuitry in the transceivers 410a-410n and/or controller/processor 425 receives analog or digital data (such as voice data, web data, e-mail, or interactive video game data) from the controller/processor 425. The TX processing circuitry encodes, multiplexes, and/or digitizes the outgoing baseband data to generate processed baseband or IF signals. The transceivers 410a-410n up-converts the baseband or IF signals to RF signals that are transmitted via the antennas 405a-405n.

The controller/processor 425 can include one or more processors or other processing devices that control the overall operation of the gNB 102. For example, the controller/processor 425 could control the reception of UL channel signals and the transmission of DL channel signals by the transceivers 410a-410n in accordance with well-known principles. The controller/processor 425 could support additional functions as well, such as more advanced wireless communication functions. For instance, the controller/processor 425 could support beam forming or directional routing operations in which outgoing/incoming signals from/to multiple antennas 405a-405n are weighted differently to effectively steer the outgoing signals in a desired direction. Any of a wide variety of other functions could be supported in the gNB 102 by the controller/processor 425.

The controller/processor 425 is also capable of executing programs and other processes resident in the memory 430, such as an OS and, for example, processes to support UE assisted on-demand robust phase calibration for distributed MIMO based on multi-port CSI-RS PMI feedback as discussed in greater detail below. The controller/processor 425 can move data into or out of the memory 430 as required by an executing process.

The controller/processor 425 is also coupled to the backhaul or network interface 435. The backhaul or network interface 435 allows the gNB 102 to communicate with other devices or systems over a backhaul connection or over a network. The interface 435 could support communications over any suitable wired or wireless connection(s). For example, when the gNB 102 is implemented as part of a cellular communication system (such as one supporting 5G/NR, LTE, or LTE-A), the interface 435 could allow the gNB 102 to communicate with other gNBs over a wired or wireless backhaul connection. When the gNB 102 is implemented as an access point, the interface 435 could allow the gNB 102 to communicate over a wired or wireless local area network or over a wired or wireless connection to a larger network (such as the Internet). The interface 435 includes any suitable structure supporting communications over a wired or wireless connection, such as an Ethernet or transceiver.

The memory 430 is coupled to the controller/processor 425. Part of the memory 430 could include a RAM, and another part of the memory 430 could include a Flash memory or other ROM.

Although FIG. 4 illustrates one example of gNB 102, various changes may be made to FIG. 4. For example, the gNB 102 could include any number of each component shown in FIG. 4. Also, various components in FIG. 4 could be combined, further subdivided, or omitted and additional components could be added according to particular needs.

For a cellular system operating in low carrier frequency in general, a sub-1 GHz frequency range (e.g., less than 1 GHz) as an example, supporting large number of CSI-RS antenna ports (e.g., 32) or many antenna elements at a single location or remote radio head (RRH) is challenging due to a larger antenna form factor size needed considering carrier frequency wavelength than a system operating at a higher frequency such as 2 GHz or 4 GHz. At such low frequencies, the maximum number of CSI-RS antenna ports that can be co-located at a site (or RRH) can be limited, for example to 8. This limits the spectral efficiency of such systems. In particular, the MU-MIMO spatial multiplexing gains offered due to large number of CSI-RS antenna ports (such as 32) can't be achieved due to the antenna form factor limitation. One way to operate a system with large number of CSI-RS antenna ports at low carrier frequency is to distribute the physical antenna ports to different panels/RRHs, which can be possibly non-collocated. The multiple sites or panels/RRHs can still be connected to a single (common) base unit forming a single antenna system, hence the signal transmitted/received via multiple distributed RRHs can still be processed at a centralized location. For example, the multiple distributed RRHs could be processed by a network entity, such as network entity 104 FIG. 1.

The present disclosure considers such a system (called distributed MIMO or multi-transmission-reception point (mTRP) or coherent joint transmission (CJT)) and can include methods to perform calibration for the RF receive/transmit antenna network of multiple RRHs/panels in the system to utilize DL/UL channel reciprocity, where the disclosed technology can be implemented, for example, based on Type I single panel codebook and feedback design.

Calibration is an important issue for distributed MIMO in general. Massive MIMO base stations use an on-board coupling network and calibration circuits, which are referred to herein as the on-board calibration for brevity, to measure the gain and phase differences among transceivers in the same radio frequency (RF) unit in order to maintain the reciprocity between DL and UL channels in the TDD system. For the on-board calibration, one RF chain corresponding to one antenna port serves as a reference to other RF chains for other antenna ports. In the case of the distributed MIMO, such reference transceiver's signal may need to be shared between distributed RRHs/panels/modules, which are physically far apart. Using RF cables to distribute the reference is not preferable as it limits the deployment scenarios. In the distributed MIMO, the use of different local oscillators (Los) between distributed antenna modules imposes even more challenges in achieving calibration as the phase of Los could drift. Periodic calibration may be needed to compensate for the phase drift as well.

The present disclosure describes over-the-air (OTA) signaling mechanisms and calculation algorithms for calibration among the RRHs/panels of distributed MIMO networks. One of the described mechanisms comprises UL RS transmission and UL channel estimation, (beamformed) DL RS transmission/reception based on UL channel estimation and calibration coefficient estimation, multiple CSI (RI/PMI/CQI) reporting, and gNB calculation based on reported CSI.

Although the present disclosure is described based on 3GPP 5G NR communication systems, various embodiments may apply in general to UEs operating with other RATs and/or standards, such as different releases/generations of 3GPP standards (including beyond 5G, 6G, and so on), IEEE standards (such as 802.16 WiMAX and 802.11 Wi-Fi), and so on.

Figure 5:
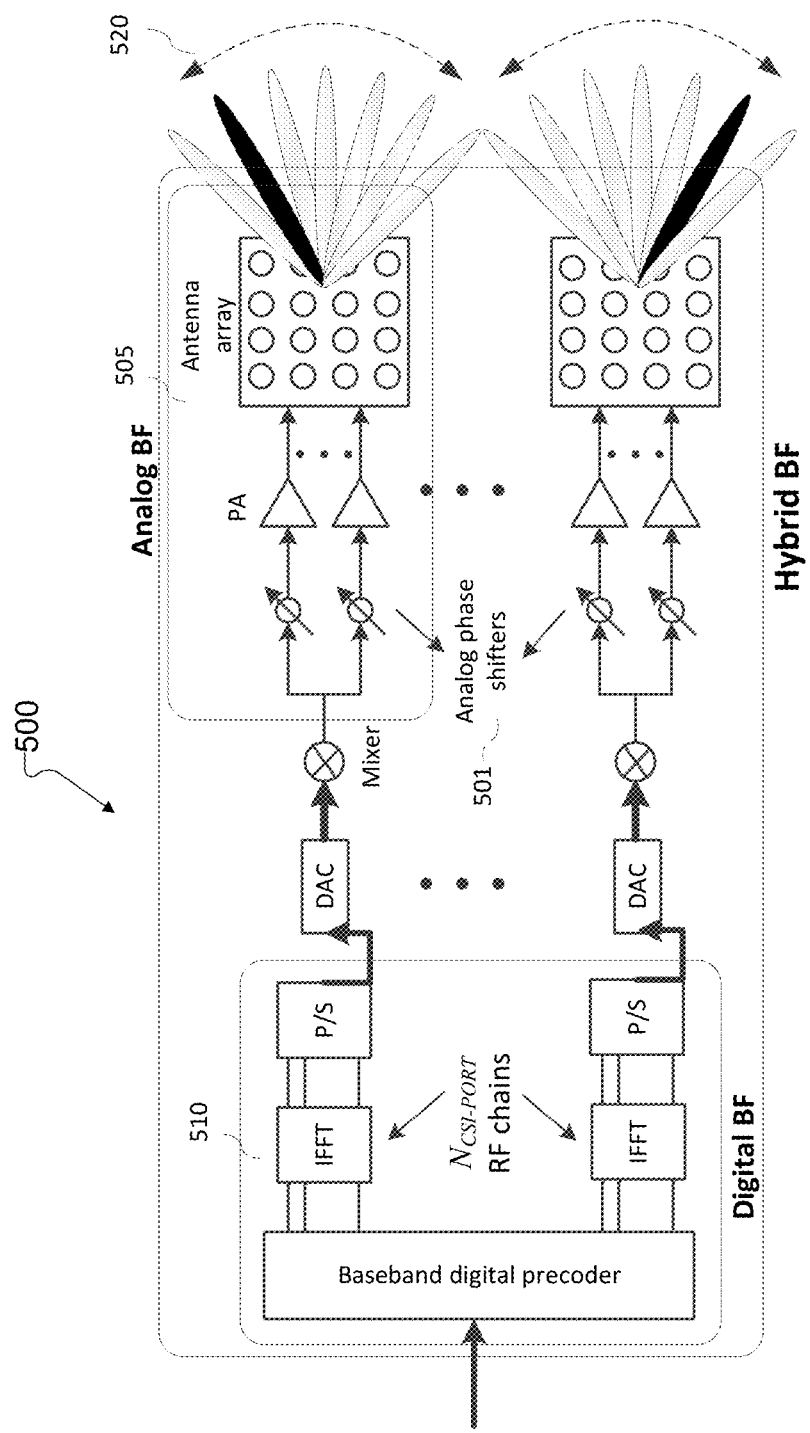
FIG. 5 illustrates an example of antenna blocks or arrays according to embodiments of the present disclosure.

FIG. 5 illustrates an example of antenna blocks or arrays 500 according to embodiments of the present disclosure. The embodiment of the antenna blocks or arrays 500 illustrated in FIG. 5 is for illustration only. Different embodiments of antenna blocks or arrays 500 could be used without departing from the scope of this disclosure.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 5. In this case, one CSI-RS port is mapped onto a large number of antenna elements which can be controlled by a bank of analog phase shifters 501. One CSI-RS port can then correspond to one sub-array which produces a narrow analog beam through analog beamforming 505. This analog beam can be configured to sweep across a wider range of angles (520) by varying the phase shifter bank across symbols or subframes. The number of sub-arrays (equal to the number of RF chains) is the same as the number of CSI-RS ports NCSI-PORT. A digital beamforming unit 510 performs a linear combination across NCSI-PORT analog beams to further increase precoding gain. While analog beams are wideband (hence not frequency-selective), digital precoding can be varied across frequency sub-bands or resource blocks. Receiver operation can be conceived analogously.

Although FIG. 5 illustrates one example of example antenna blocks or arrays 400, various changes may be made to FIG. 5. For example, the example antenna blocks or arrays 500 could include any number of each component shown in FIG. 5. Also, various components in FIG. 5 could be combined, further subdivided, or omitted and additional components could be added according to particular needs.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @100m distance), larger number of and sharper analog beams (hence larger number of radiators in the array) may be needed to compensate for the additional path loss.

At lower frequency bands such as FR1 or particularly sub-1 GHz band, on the other hand, the number of antenna elements cannot be increased in a given form factor due to large wavelength if a critical distance (≥λ/2) between two adjacent antenna elements is maintained in deployment scenarios. As an example, for the case of the wavelength size (λ) of the center frequency 600 MHz (which is 50 cm), it may require 4 m for uniform-linear-array (ULA) antenna panel of 16 antenna elements with the half-wavelength distance between two adjacent antenna elements. Considering a plurality of antenna elements is mapped to one digital port in practical cases, the required size for antenna panels at gNB to support a large number of antenna ports, e.g., 32 CSI-RS ports, becomes very large in such low frequency bands, and it leads to the difficulty of deploying 2-D antenna arrays within the size of a conventional form factor. This can result in a limited number of physical antenna elements and, subsequently CSI-RS ports, that can be supported at a single site and limit the spectral efficiency of such systems.

Figure 6:
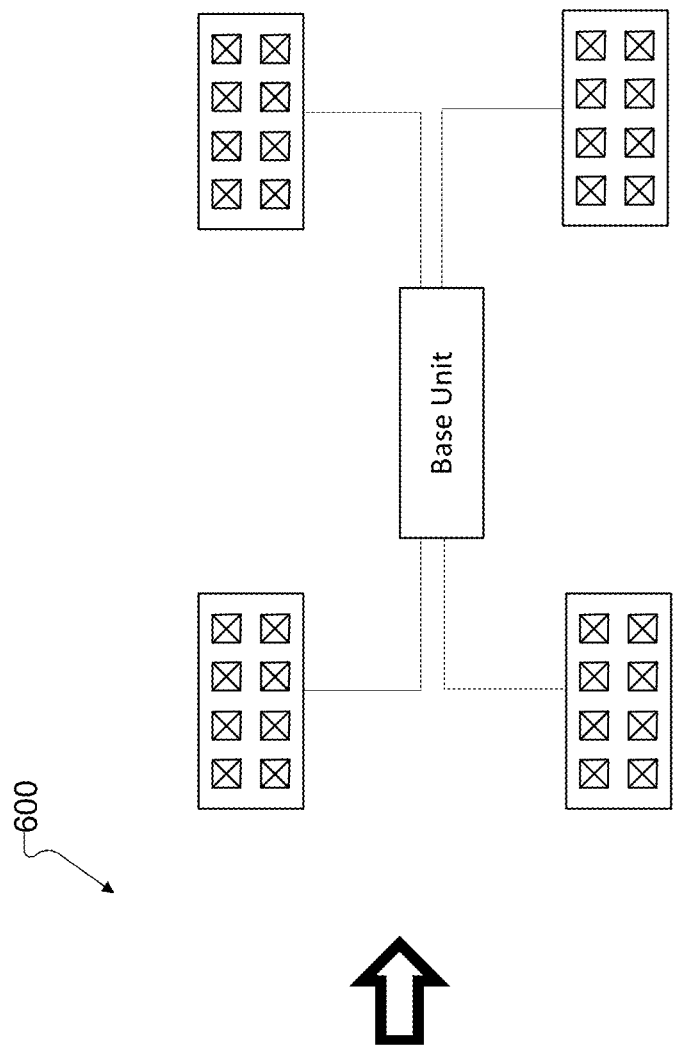
FIG. 6 illustrates an example of distributed MIMO according to embodiments of the present disclosure.
Figure 6:
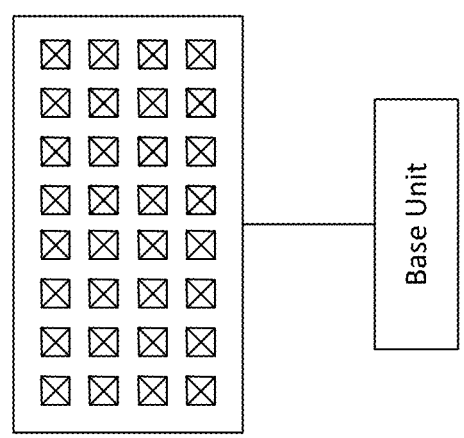

One possible approach to resolve the issue is to form multiple antenna panels (e.g., antenna modules, RRHs) with a small number of antenna ports instead of integrating all of the antenna ports in a single panel (or at a single site) and to distribute the multiple panels in multiple locations/sites (or RRHs), as illustrated in FIG. 6.

FIG. 6 illustrates an example of distributed MIMO 600 according to embodiments of the present disclosure. In the example of FIG. 6, distributed MIMO 600 is formed from multiple antenna panels, such as antenna modules or RRHs, with a small number of antenna ports instead of integrating all the antenna ports in a single panel or at a single site and distributing the multiple panels in multiple locations/sites or RRHs. The example of FIG. 6 may be implemented by a BS. For example, the example of distributed MIMO 600 may be implemented by one or more BSs such as BS 102. The MIMO 600 is for illustration only and other embodiments can be used without departing from the scope of the present disclosure.

Figure 7:
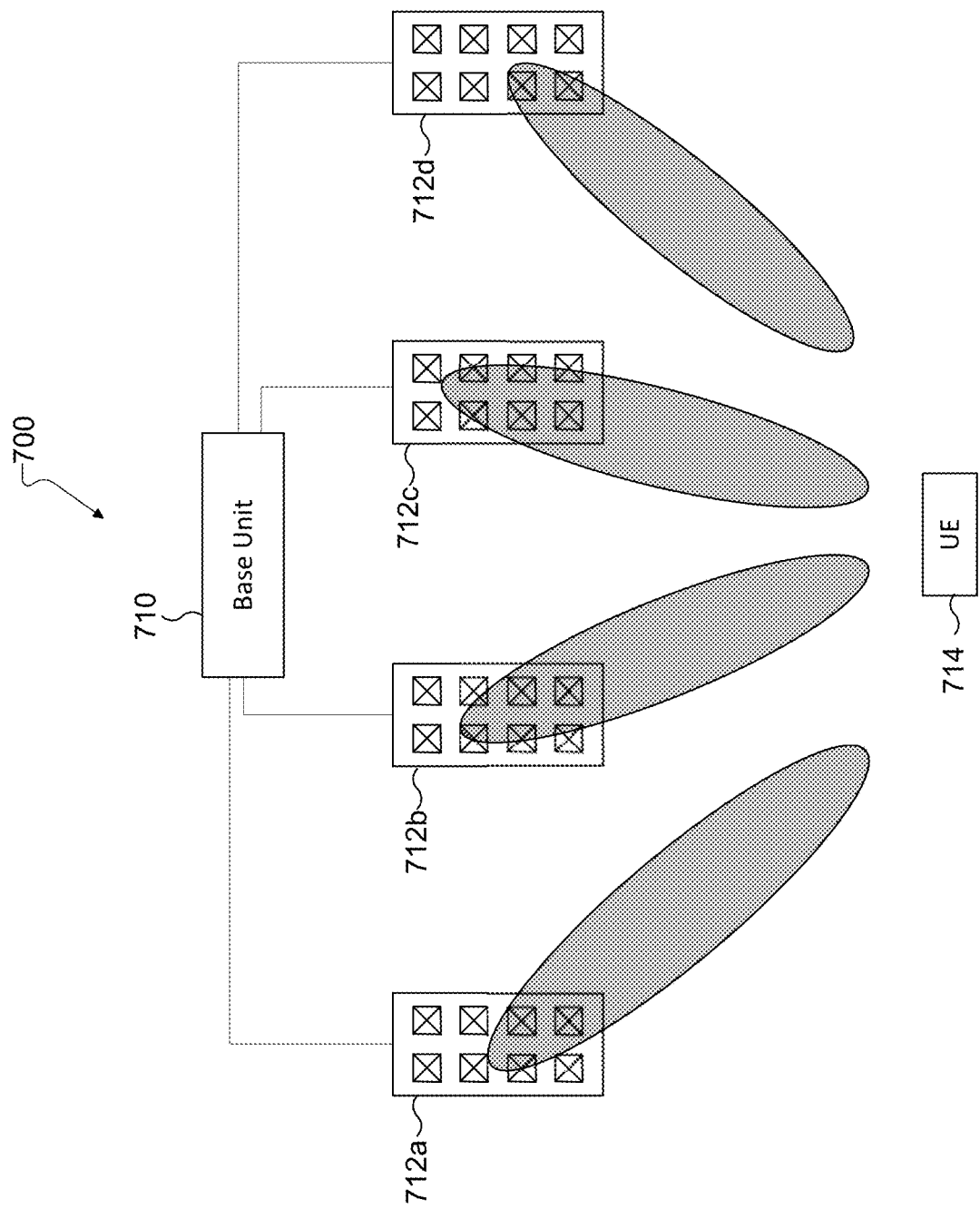
FIG. 7 illustrates another example of distributed MIMO according to embodiments of the present disclosure.

The multiple antenna panels at multiple locations can still be connected to a single base unit, and thus the signal transmitted/received via multiple distributed panels can be processed in a centralized manner through the single base unit, as illustrated in FIG. 7. In another embodiment, it is possible that multiple distributed antenna panels are connected to more than one base units, which communicates with each other and jointly supporting single antenna system.

FIG. 7 illustrates another example of distributed MIMO 700 according to embodiments of the present disclosure. In the example of FIG. 7, multiple antenna locations 712-712d are connected to a single base unit 710. The base unit 710 may process signals transmitted and received via antenna locations 712a-712d in a centralized manner. For example, base unit 710 may process signals transmitted and received to UE 714. The example of FIG. 7 may be implemented by a BS. For example, the distributed MIMO 700 may be implemented by one or more BSs such as BS 102. The example of distributed MIMO 700 is for illustration only and other embodiments can be used without departing from the scope of the present disclosure.

As illustrated, multiple antenna panels at multiple locations can still be connected to a single base unit (e.g., in one of BSs 101-103). Thus, the signal transmitted/received via multiple distributed panels can be processed in a centralized manner through the single base unit. In another embodiment, multiple distributed antenna panels are connected to more than one base unit, which communicates with each other while jointly supporting the single antenna system.

In time division duplexing (TDD), a common approach to acquire DL channel state information is to exploit UL channel estimation through receiving UL RSs for example, a sounding reference signal (SRS), sent from a UE. By using the channel reciprocity in TDD systems, the UL channel estimation itself can be used to infer DL channels. This favorable feature enables the network (NW) to reduce the training overhead significantly. However, due to the RF impairment at the transmitter and receiver, directly using the UL channels for DL channels is not accurate and it may require a periodic calibration process among receive and transmit antenna ports of the RF network at NW. In general, the NW has an on-board calibration mechanism in its own RF network to calibrate its antenna panels having a plurality of receiver/transmitter antenna ports, to enable DL/UL channel reciprocity in channel acquisition. The on-board calibration mechanism can be performed via small-power RS transmission and reception from/to the RF antenna network of the NW and thus it can be done by the NW's implementation in a confined manner, i.e., that does not interfere with other entities. However, it becomes difficult to perform the on-board calibration in distributed MIMO systems due to the distribution of the panels/RRHs over a wide region. Thus, over-the-air (OTA) signaling mechanisms are provided to calibrate receive/transmit antenna ports among multiple RRHs/panels far away in distributed MIMO.

The disclosed technology can include UE-assisted calibration mechanisms for distributed MIMO systems. A high-level description of multiple CSI reporting was briefly introduced in U.S. application Ser. No. 17/673,641 filed on Feb. 16, 2022, which is incorporated by reference in its entirety. Although low-band TDD systems are exemplified for motivation purposes, the present disclosure can be applied to any frequency band in FR1 and/or FDD systems.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can comprise one or multiple slots) or one slot.

Although low-band TDD systems are exemplified for motivation purposes, the present disclosure can be applied to any frequency band in FR1 and/or FDD systems.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can comprise one or multiple slots) or one slot.

Figure 8:
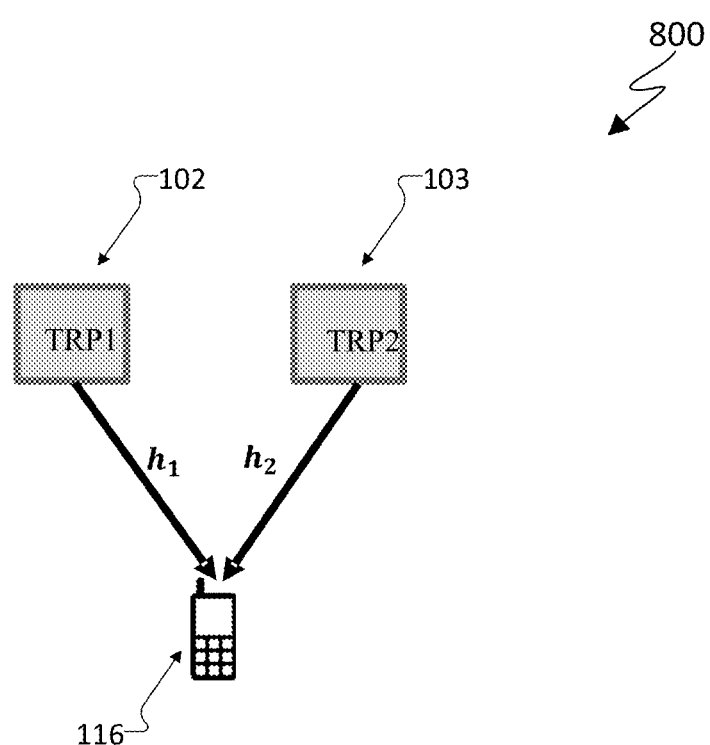
FIG. 8 illustrates an example of joint transmission from two TRPs to a single UE according to embodiments of the present disclosure.

FIG. 8 illustrates an example 800 of joint transmission from two TRPs to a single UE according to embodiments of the present disclosure. The embodiment of joint transmission illustrated in FIG. 8 is for illustration only. Different embodiments of joint transmission could be used without departing from the scope of this disclosure.

In the example of FIG. 8, TRP1 (i.e., gNB 102) and TRP2 (i.e., gNB 103) transmit a single-user (SU) multi-carrier downlink (DL) data transmission to UE 116.

The received signal at UE 116 can then be given as, $$y(f) = \alpha(H_1(f)P_1 + e^{j(2\pi\Delta\tau f + \Delta\varphi_0)}H_2(f)P_2)x + n, \quad (1)$$

where x is the transmitted data from the two TRPs (i.e., gNB 103 and 103). $H_i(f)$, $P_i$ are channel and precoding vectors, respectively of $f$-th sub-carrier from i-th TRP with i=1, 2 and n is Additive white Gaussian noise (AWGN) at the UE. Note here that, $\Delta\varphi$ is a phase offset arising due to RF impairments between the two TRPs and Dr is the timing mismatch between TRP1 and TRP2.

In particular, $\Delta\varphi_0$ is a common phase offset on all the sub-carriers where $\Delta\tau$ generates a phase ramp across sub-carriers. The resultant phase offset may be denoted as, $\varphi(f)=2\pi\Delta\tau f+\Delta\varphi_0$.

The same phase offset may be observed for multiple sub-carriers as long as the following condition is satisfied:

$$e^{j(2\pi\Delta\tau f_1 + \Delta\varphi_0)} = e^{j(2\pi\Delta\tau f_2 + \Delta\varphi_0)} \quad (2)$$

$$(2\pi\Delta\tau f_1 + \Delta\varphi_0) \bmod 2\pi = (2\pi\Delta\tau f_2 + \Delta\varphi_0) \bmod 2\pi$$

with $f_1 \neq f_2$.

Although FIG. 8 illustrates one example 800 of joint transmission, various changes may be made to FIG. 8. For example, the number of gNBs, TRPs, etc. could change according to particular needs.

According to equation (1), without the knowledge of $\Delta\varphi_0$ and $\Delta\tau$, the signals received from two TRPs may not be constructively combined at the serving UE. Hence, $\Delta\varphi_0$ and $\Delta\tau$ may need to be sufficiently compensated for achieving gains for joint transmission. Therefore, a robust calibration algorithm to correct those phase/timing impairments prior to the actual data transmission is desirable. This is a challenging task, given additional constraints such as limited information exchange between TRPs in commercial 5G networks.

The present disclosure can include a method to compensate the relative phase difference between two TRPs in a given time and frequency. This phase offset can comprise two components: relative timing offset, and common phase offset between two TRPs as shown in equation (2). Timing mismatch of two TRPs is due to the relative timing offset difference that depend on processing time offsets of electronics and processing components within each TRP processing data flow. While the common phase $\Delta\phi_0$ doesn't depend on frequency, the phase timing mismatch is linearly dependent on the frequency of the signals. In some cases, based on equation (2), the disclosed technology's phase timing calibration algorithm may be summarized as determining the correct phase timing slope in addition to phase offset calibration algorithms in distributed MIMO.

To get correct the phase timing slope within a bandwidth, two or more calibrated phases at multiple different frequency bands are used. If there are severe noise and PMI feedback errors or a large bandwidth, more than two calibrated phases may be used to get a robust phase timing calibration result. In the following discussion, the disclosed technology can, for example, assume using two calibrated phases at two different bands as illustrated in FIG. 9.

Figure 9:
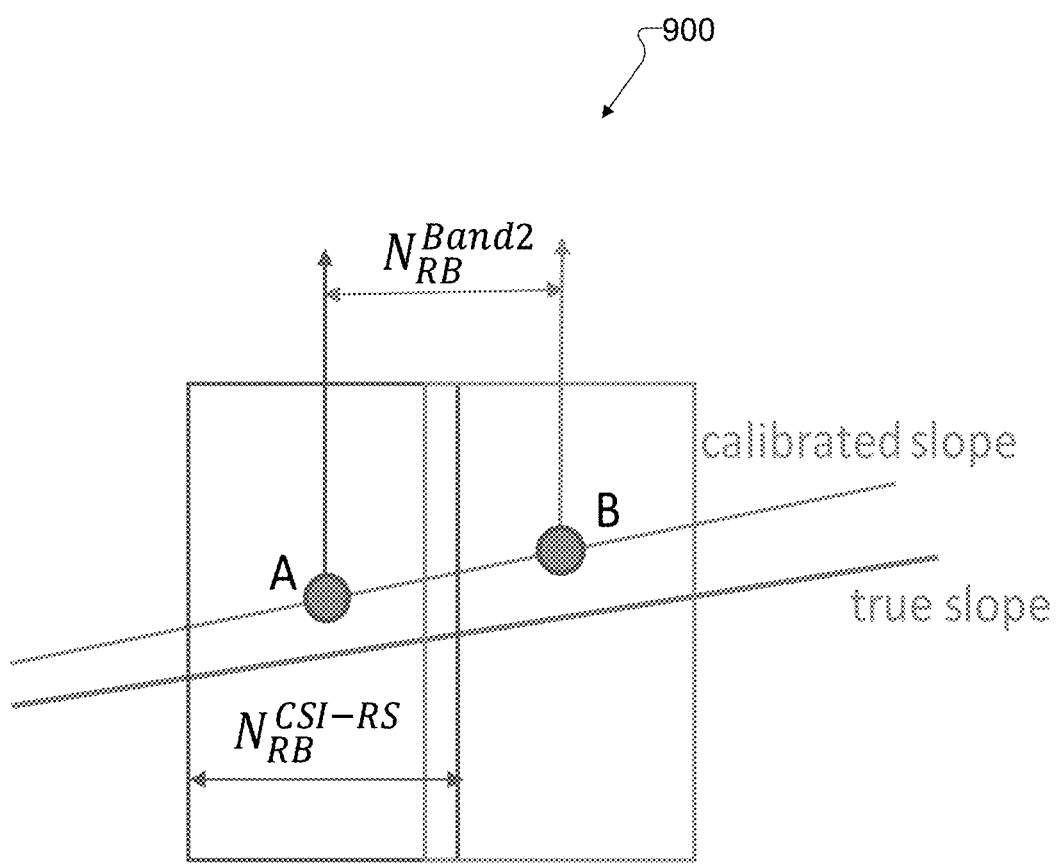
FIG. 9 illustrates an example of determining a phase-timing slope according to embodiments of the present disclosure.

FIG. 9 illustrates an example 900 of determining a phase-timing slope according to embodiments of the present disclosure. The embodiment of determining a phase-timing slope in FIG. 9 is for illustration only. Different embodiments of determining a phase-timing slope could be used without departing from the scope of this disclosure.

In the example of FIG. 9, there are two design parameters for the disclosed technology's phase timing calibration algorithm. $N_{RB}^{Band2}$ and $N_{RB}^{CSI-RS}$. $N_{RB}^{Band2}$ is a number of resource blocks (RBs) separation (e.g., a band separation) between two CSI-RS resources A and B. $N_{RB}^{CSI-RS}$ is a number of resource blocks (e.g., a bandwidth) within each of the two CSI-RS resources A and B. Assuming $P_{A'}$, $P_{B'}$ are calibrated phases of two true phases $P_A$, $P_B$ using a phase calibration algorithm, this can provide:

$$P_{A'} = P_A + \Delta A$$
$$P_{B'} = P_B + \Delta B$$

where $\Delta A$, $\Delta B$ are phase calibration errors. The phase timing slope can be calculated as $$\text{slope}_{cal} = \frac{P_{A'} - P_{B'}}{\Delta BW} = \frac{P_A - P_B}{N_{RB}^{Band2}} + \frac{\Delta A - \Delta B}{N_{RB}^{Band2}} = \text{slope}_{true} + \frac{\Delta A - \Delta B}{N_{RB}^{Band2}} \quad (3)$$

Assuming that mCalErr is the maximum calibration error of the phase calibration algorithm used to get two calibrated phase measurements, this can provide:

$$\text{slope}_{true} - \frac{2*mCalErr}{N_{RB}^{Band2}} \leq \text{slope}_{cal} \leq \text{slope}_{true} + \frac{2*mCalErr}{N_{RB}^{Band2}} \quad (4)$$

where $$\frac{2*mCalErr}{N_{RB}^{Band2}}$$

is phase timing slope error of the disclosed technology's timing calibration algorithm, which depends on the performance of the phase calibration algorithms. The phase timing slope (4) will be determined based on the target calibration errors mCalErr and the two design parameters $N_{RB}^{Band2}$, $N_{RB}^{CSI-RS}$. These two design parameters and phase wraparound issues will depend on a target maximum timing mismatch of the system hardware implementations, which are provided by the system level simulations or system hardware measurements.

In the following discussion, the disclosed technology's phase-timing calibration is applied, for example, for an assumed worst case scenario with a timing mismatch of $\tau_{max}$=80 ns. The expected calibration algorithm can achieve the theoretical maximum tolerated timing mismatch error $\tau_{min}$ of 10 ns as determined by system level simulations. The following example assumes $\tau_{min}$=10 ns, and carrier spacing of $\Delta F_{min}$=30 kHz.

In one embodiment, two calibrated phases in two CSIRS resources are used for timing calibration. The two-band separation $N_{RB}^{Band2}$ can be determined based on a target tolerated timing mismatch $\tau_{min}$. For this example, where it is assumed $\tau_{min}$=10 ns, this can provide:

$$\frac{20}{N_{RB}^{Band2}} \leq \frac{2\pi\Delta F\tau_{min}}{\Delta F} = 2\pi\tau_{min} = 360*10*10^{-9} \quad (5)$$

$$N_{RB}^{Band2} \geq 5.56 \text{ MHz} = 15.4 \text{ RBs}$$

$$N_{RB}^{Band2} \geq 16 \text{ RBs}$$

Thus, to get the phase timing slope within the target timing mismatch 10 ns, separation between the two calibrated phases larger than 16 RBs may be required. According to this result, for a smaller target tolerated timing mismatch, a larger $N_{RB}^{Band2}$ should be used between 2 calibrated phases in order to fulfill the target timing mismatch $\tau_{min}$.

Although FIG. 9 illustrates one example 900 of determining a phase-timing slope, various changes may be made to FIG. 9. For example, the band separation, the bandwidth, etc. could change according to particular needs.

In one embodiment, the condition of $N_{RB}^{Band2}$ ban be determined based on the carrier spacing $\Delta F_{min}$ and the worse-case timing mismatch of the system $\tau_{max}$. With the assumption $\Delta F_{min}$=30 kHz, $\tau_{max}$=80 ns, the phase difference within one RB (RB phase granularity) can be $$\Delta\phi_{rb} = 2\pi \times 360 \times 10^3 * 80 \times 10^{-9} \times \frac{180}{\pi} = 10.36o.$$

That is to say, the phase granularity between resources blocks is 10.36o. With $\Delta\phi_{rb}$=10.36o, there are phase wraparound issues in 20 MHz bandwidth (or 50 RBs) illustrated in FIG. 10.

Figure 10:
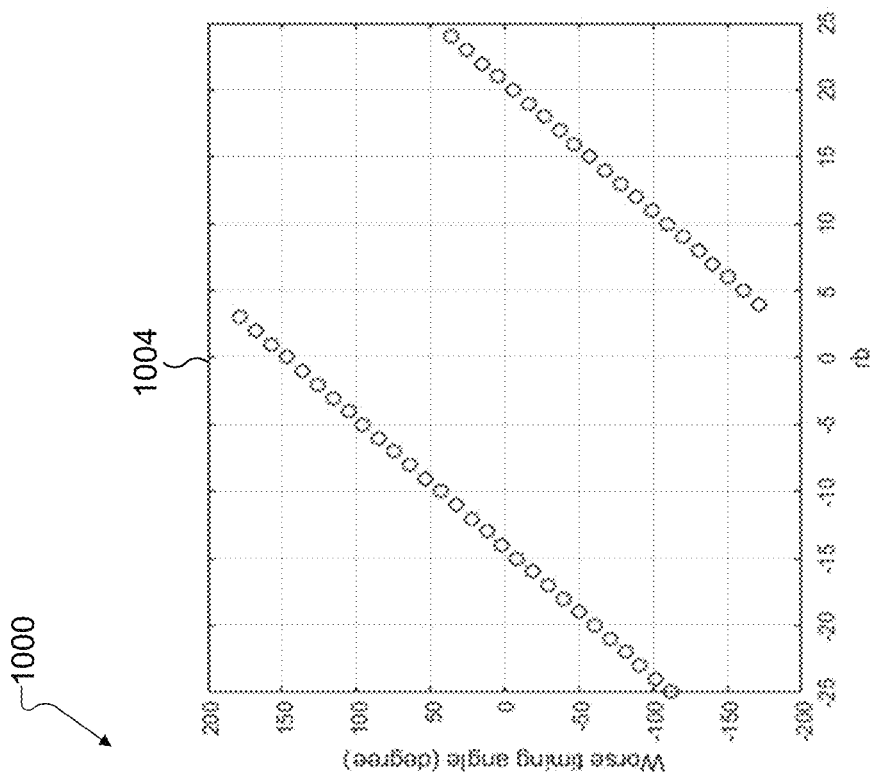
FIG. 10 illustrates an example of phase wraparounds according to embodiments of the present disclosure.
Figure 10:
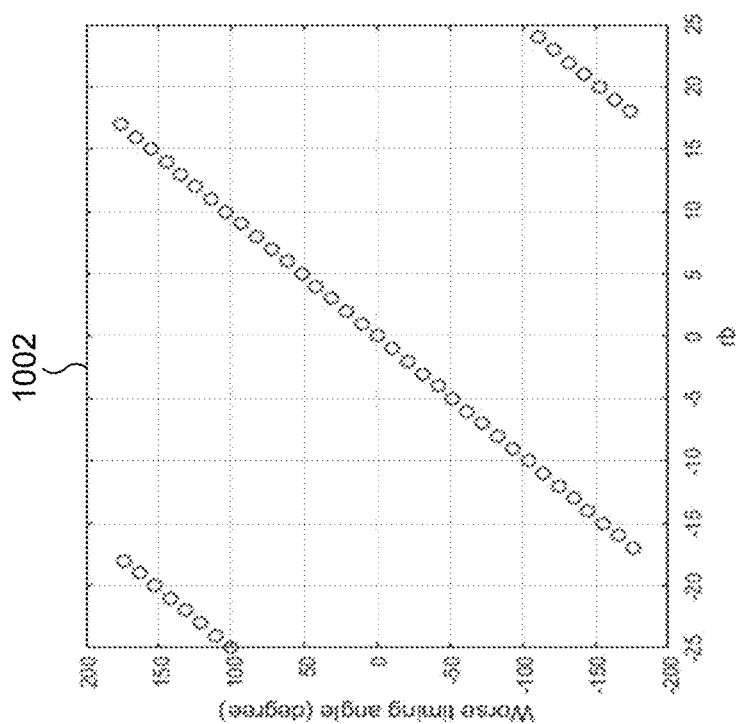

FIG. 10 illustrates an example 1000 of phase wraparounds according to embodiments of the present disclosure. The example of phase wraparounds in FIG. 10 is for illustration only. Different examples of phase-wraparounds could be used without departing from the scope of this disclosure.

In the example of FIG. 10, phase ramps are plotted with one-phase (1002) and two-phase (1004) wraparounds when the common phase $\Delta\varphi_0=0,140$, respectively, and the timing mismatch between two TRPs is 80 ns. The number of phase wraparounds depends on the values of $\Delta\varphi_0$. Many more phase wraparounds will occur if large bandwidths, i.e., 100 MHz, are considered. These phase wraparounds can pose a challenging issue to detect a correct phase timing slope due to timing mismatch, especially in noisy channel conditions. In normal conditions, two calibrated phases in two different frequencies are enough to detect a timing slope. More than two calibrated phases can be utilized in case of large bandwidths or very noisy conditions to have a reliable timing slope. If only two calibrated phases measured on two CSIRS resources are supported, to avoid the phase wraparound problem, the number of RBs separation is limited, so that a wrong timing slope, due to a phase wraparound issue, can be detected. Considering that constraint, $$N_{RB}^{Band2} * \Delta\phi_{rb} < 180 - CalErr < 180 - 10 = 170 \quad (6)$$

$$\rightarrow N_{RB}^{Band2} \leq 16$$

From equations (5) and (6), $N_{RB}^{Band2}=16$ RBs is obtained.

Although FIG. 10 illustrates one example 1000 of phase wraparounds, various changes may be made to FIG. 10. For example, the common phase, the timing mismatch, etc. could change according to particular needs.

In another embodiment, equations (5) and (6) might contradict each other. Then, the two calibrated phases might be not enough to produce a correct phase timing slope that is within the tolerated timing mismatch $\tau_{min}$. In this embodiment, one or more calibrated phases are used to get the correct phase timing slope, and (5) is the condition of the farthest distance between two end calibrated phase locations. Now, (6) will be the condition of getting the correct phase timing slope between any two calibrated phase locations.

In one embodiment, if because of UE capability only two calibrated phases measured on two CSIRS resources are available that satisfy the conditions (5) and (6), the correct timing phase slope can be determined as follows. In this example assume $\Delta F_{min}=30$ kHz, $\tau_{max}=80$ ns, which yields $N_{RB}^{Band2}=16$ RBs. Thus, if the two phases are located in the same phase ramp (without phase wraparound occurring between these two phases), then the phase distance between them is $\Delta\phi_{rb} * N_{RB}^{Band2}=10.36*16=165.76$. If there is one wraparound phase occurred between the two phases, then the unwrapped phase distance between them is $360-\Delta\phi_{rb} * N_{RB}^{Band2}=360-10.36*16=194.24$. Therefore, a phase threshold to differentiate the above cases is $\phi_t=180$.

In another embodiment, having two calibrated phases $\phi_1$, $\phi_2$ whose locations satisfy conditions (5) and (6), then if $|\phi_2-\phi_1|\leq\phi_t$ then the phase timing slope is $$slope_{cal} = \frac{\phi_2 - \phi_1}{N_{RB}^{Band2}} \quad (7)$$

In another embodiment, having two calibrated phases $\phi_1$, $\phi_2$ whose locations satisfy conditions (5) and (6), then if $|\phi_2-\phi_1|>\phi_t$ then the phase timing slope is $$slope_{cal} = \frac{sign(\phi_2) * (360o - |\phi_2|) - \phi_1}{N_{RB}^{Band2}} \quad (8)$$

The design parameter $N_{RB}^{CSI-RS}$ should be chosen to limit or eliminate phase wraparounds. If there are phase wraparounds within a CSI-RS, there is throughput (Tput) loss/degradation. Assuming a bandwidth of 20 mhz, each RB=12*30 KHz=360 KHz. Depending on the timing mismatch, multiple phase wraparounds occur within the CSI-RS resource. This is illustrated in TABLE 1.

TABLE 1

| Timing mismatch | # RBs in [−π, π] | # phase wraparounds in 20 MHz | % gain loss vs CAL_ON (UMA) |
|---|---|---|---|
| 10 ns | 278 | 1 or 2 | −4% |
| 20 ns | 139 | 1 or 2 | −12% |
| 40 ns | 69 | 1 or 2 | −48.4% |
| 80 ns | 35 | 2 or 3 | −115% |

Depending on the common phase, there can be 2-3 phase wraparounds within the 20 MHz bandwidth. The larger timing mismatch, the more chances exist that can have multiple phase wraparounds, resulting in lower Tput.

In the example of TABLE 1, With $\tau_{max}\leq80$ ns, $N_{RB}^{CSI-RS}<35$, 35 is the maximum number RBs within one phase ramps [−π, π].

If $N_{RB}^{CSI-RS}$ is too large, it can have multiple phase ramps, resulting in incorrect PMI feedback. However, $N_{RB}^{CSI-RS}$ should not be too small, as there will not be enough signal to noise ratio (SNR) to get correct PMI feedback.

In one embodiment, 3 calibrated phases may be used to obtain a correct phase timing slope for a very large bandwidth, i.e., 100 MHz using 3 calibrated phases. An example is illustrated in FIG. 11.

Figure 11:
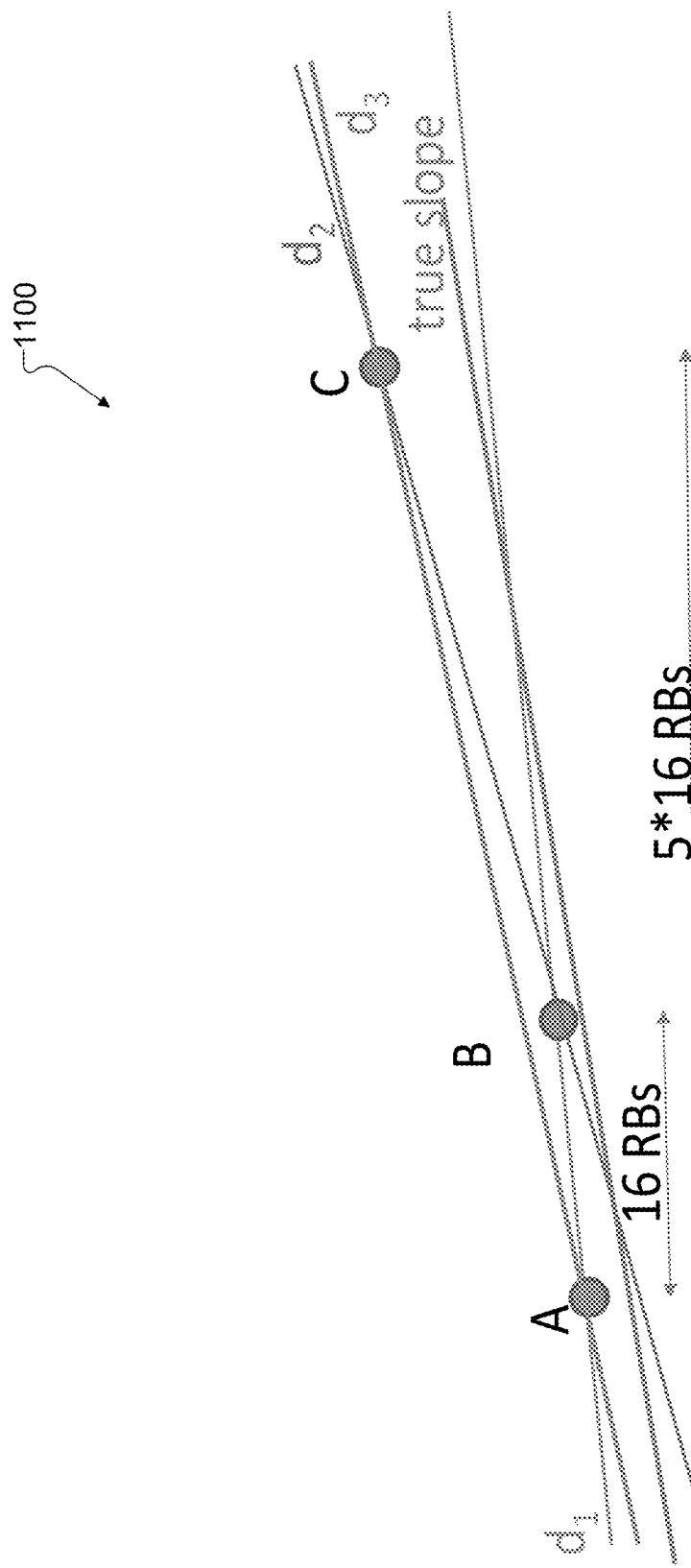
FIG. 11 illustrates an example of determining a phase-timing slope according to embodiments of the present disclosure.

FIG. 11 illustrates an example 1100 of determining a phase-timing slope according to embodiments of the present disclosure. The embodiment determining a phase-timing slope in FIG. 11 is for illustration only. Different embodiments of determining a phase-timing slope could be used without departing from the scope of this disclosure.

In the example of FIG. 11, a phase timing slope is determined based on three calibrated phases for CSI-RS resources A, B, and C. The same assumptions $\Delta F_{min}=30$ kHz, $\tau_{max}=80$ ns, from previous examples are used, but since the bandwidth is large, the tolerated timing mismatch is reduced accordingly to $\tau_{min}=2$ ns.

In one embodiment, the first two calibrated phases (A,B) are located to get the correct phase timing slope. From equation (6), there two phases that are separate in a distance of less than or equal 16 RBs, with a worse case timing mismatch of 80 ns. The distance of 16 RBs or smaller may be chose. The smaller the distance, the more correct the slope can be distinguished as shown in (6). In this example the distance of 15 RBs is chosen. By applying equations (7), and (8) the correct phase timing slope $slope_{cal}$ of the line $d_1$ can be found.

In another embodiment, the frequency bands of the third phase are chosen to be at least 80 RBs or higher separation from the first phase location. Choosing the separation of 80 RBs results in a maximum ceil $(\phi_{rb}*N_{RB}^{Band2}/360)+1$ ceil $(10.36*80/360)+1=4$ phase wraparounds. Based on the timing slope from the two calibrated phases in the above embodiment, the unwrap around values of the third phase can be found by setting $\phi_3=\phi_3+sign(slope_{cal})*k*360$, with k=1, 2, 3, 4. The value of k can be found such that $\phi_3$ is closest to the line connecting the first two calibrated phases A and B.

In another embodiment, once the third calibrated phase (C) is found as according to the above embodiment, another other two lines $d_2$ via B and C; and $d_3$ via A and C can be determined.

In another embodiment, based on three lines $d_1$, $d_2$, $d_3$, the calibrated timing phase is determined as a fit line that is closest to the phases A, B, C.

In one embodiment, the method c and be extended to additional calibrated phases to get a phase timing slope close to the true phase.

Although FIG. 11 illustrates one example 1100 of determining a phase-timing slope, various changes may be made to FIG. 11. For example, the band separation, the number of calibrated phases, etc. could change according to particular needs.

Figure 12:
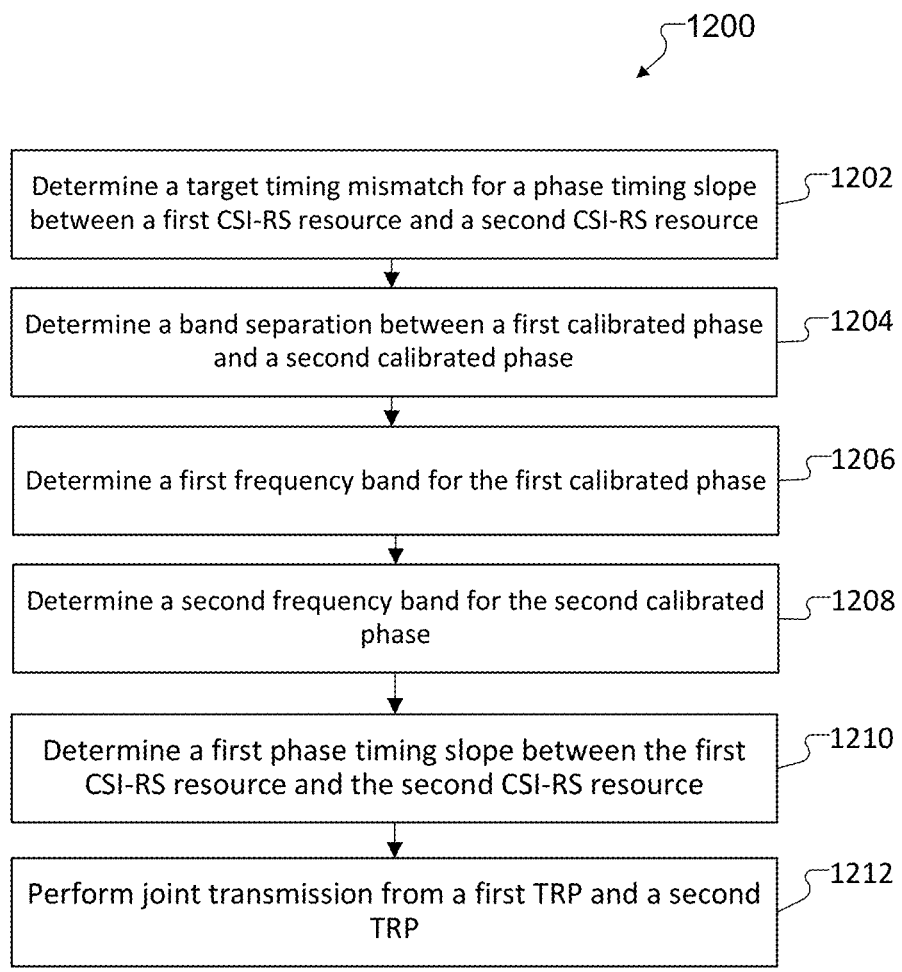
FIG. 12 illustrates a method for phase-timing calibration for distributed MIMO using 2 CSI-RS resources according to embodiments of the present disclosure.

FIG. 12 illustrates a method 1200 for phase-timing calibration for distributed MIMO using 2 CSI-RS resources according to embodiments of the present disclosure. An embodiment of the method illustrated in FIG. 12 is for illustration only. One or more of the components illustrated in FIG. 12 may be implemented in specialized circuitry configured to perform the noted functions or one or more of the components may be implemented by one or more processors executing instructions to perform the noted functions. Other embodiments of phase-timing calibration for distributed MIMO using 2 CSI-RS resources could be used without departing from the scope of this disclosure.

As illustrated in FIG. 12, the method 1200 begins at step 1202. At step 1202, a network entity such as gNB 102 or NE 104 of FIG. 1, determines a target timing mismatch for a phase timing slope between a CSI-RS resource and a second CSI-RS resource. At step 1204, the network entity determines, based on the target timing mismatch, a band separation between a first calibrated phase for the first CSI-RS resource and the second CSI-RS resource and a second calibrated phase for the first CSI-RS resource and the second CSI-RS resource. At step 1206, the network entity determines a first frequency band for the first calibrated phase. At step 1208, the network entity determines, based on the band separation, a second frequency band for the second calibrated phase. At step 1210, the network entity determines, based on the band separation between the first calibrated phase the second calibrated phase, a first phase timing slope between the first CSI-RS resource and the second CSI-RS resource. Finally, At step 1212, the network entity performs joint transmission from a first TRP and a second TRP based on the first phase timing slope.

Figure 13:
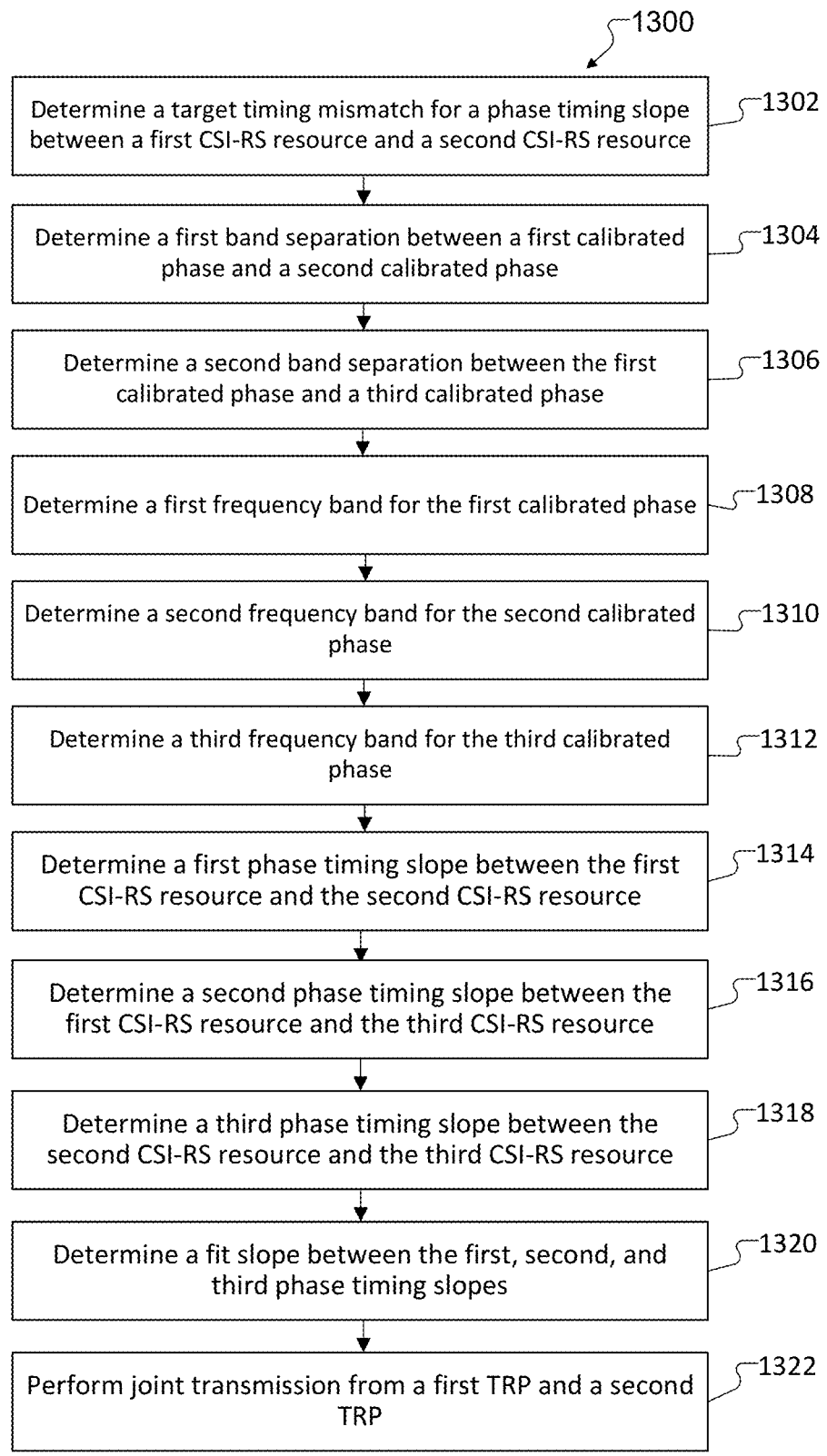
FIG. 13 illustrates a method for phase-timing calibration for distributed MIMO using 3 CSI-RS resources according to embodiments of the present disclosure.

Although FIG. 12 illustrates one example of a method 1200 for phase-timing calibration for distributed MIMO using 2 CSI-RS resources, various changes may be made to FIG. 13. For example, while shown as a series of steps, various steps in FIG. 12 could overlap, occur in parallel, occur in a different order, or occur any number of times.

FIG. 13 illustrates a method 1300 for phase-timing calibration for distributed MIMO using 3 CSI-RS resources according to embodiments of the present disclosure. An embodiment of the method illustrated in FIG. 13 is for illustration only. One or more of the components illustrated in FIG. 13 may be implemented in specialized circuitry configured to perform the noted functions or one or more of the components may be implemented by one or more processors executing instructions to perform the noted functions. Other embodiments of phase-timing calibration for distributed MIMO using 2 CSI-RS resources could be used without departing from the scope of this disclosure.

As illustrated in FIG. 13, the method 1300 begins at step 1302. At step 1302, a network entity such as gNB 102 or NE 104 of FIG. 1, determines a target timing mismatch for a phase timing slope between a CSI-RS resource and a second CSI-RS resource. At step 1304, the network entity determines, based on the target timing mismatch, a first band separation between a first calibrated phase for the first CSI-RS resource and the second CSI-RS resource and a second calibrated phase for the first CSI-RS resource and the second CSI-RS resource. At step 1306, the network entity determines, based on a target bandwidth, a second band separation between the first calibrated phase and a third calibrated phase for the first CSI-RS resource and the second CSI-RS resource. At step 1308, the network entity determines a first frequency band for the first calibrated phase. At step 1310, the network entity determines, based on the first band separation, a second frequency band for the second calibrated phase. At step 1312, the network entity determines, based on the second band separation, a third frequency band for the third calibrated phase. At step 1314, the network entity determines, based on the first band separation between the first calibrated phase and the second calibrated phase, a first phase timing slope between the first CSI-RS resource and the second CSI-RS resource. At step 1316, the network entity determines, based on the second band separation between the first calibrated phase and the third calibrated phase, a second phase timing slope between the first CSI-RS resource and the third CSI-RS resource. At step 1318, the network entity determines, based on a third band separation between the second calibrated phase and the third calibrated phase, a third phase timing slope between the second CSI-RS resource and the third CSI-RS resource. At step 1320, the network entity determines a fit slope between the first, second, and third phase timing slopes. Finally, at step 1322, the network entity performs joint transmission from a first TRP and a second TRP based on the determined fit slope.

Although FIG. 13 illustrates one example of a method 1300 for phase-timing calibration for distributed MIMO using 3 CSI-RS resources, various changes may be made to FIG. 13. For example, while shown as a series of steps, various steps in FIG. 13 could overlap, occur in parallel, occur in a different order, or occur any number of times.

Any of the above variation embodiments can be utilized independently or in combination with at least one other variation embodiment. The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claim scope. The scope of patented subject matter is defined by the claims.

What is claimed is:

1. A network entity comprising:
    a memory; and
    a processor operably coupled to the memory, the processor configured to:

determine a target timing mismatch for a phase timing slope between a first channel state information-reference signal (CSI-RS) resource and a second CSI-RS resource;

determine, based on the target timing mismatch, a first band separation between a first calibrated phase for the first CSI-RS resource and the second CSI-RS resource and a second calibrated phase for the first CSI-RS resource and the second CSI-RS resource;

determine a first frequency band for the first calibrated phase;

determine, based on the first band separation, a second frequency band for the second calibrated phase;

determine, based on the first band separation between the first calibrated phase the second calibrated phase, a first phase timing slope between the first CSI-RS resource and the second CSI-RS resource; and perform joint transmission from a first transmit-receive point (TRP) and a second TRP based on the first phase timing slope.

2. The network entity of claim 1, wherein the processor is further configured to:

determine a resource block (RB) phase granularity between the first calibrated phase and the second calibrated phase; and determine a target calibration error for the first calibrated phase and the second calibrated phase;

wherein the first band separation is determined based on the RB phase granularity and the target calibration error.

3. The network entity of claim 1, wherein the processor is further configured to:

determine whether the absolute value of a phase difference between the second calibrated phase and the first calibrated phase exceeds a phase threshold; and if the phase threshold is exceeded, determine the first phase timing slope based on an unwrapping of the second calibrated phase.

4. The network entity of claim 1, wherein the processor is further configured to:

determine, based on the target timing mismatch, a bandwidth for the first CSI-RS resource and the second CSI-RS resource, wherein the bandwidth is determined to reduce a number of phase wraparounds between the first CSI-RS resource and the second CSI-RS resource.

5. The network entity of claim 4, wherein the bandwidth for the first CSI-RS resource is a number of resource blocks within the first CSI-RS resource, and the bandwidth for the second CSI-RS resource is a number of resource blocks within the second CSI-RS resource.

6. The network entity of claim 5, wherein the bandwidth is less than a maximum number of resource blocks within one phase ramp.

7. The network entity of claim 1, wherein the processor is further configured to:

determine, based on a target bandwidth, a second band separation between the first calibrated phase and a third calibrated phase for the first CSI-RS resource and the second CSI-RS resource;

determine, based on the second band separation, a third frequency band for the third calibrated phase;

determine a second phase timing slope between the first calibrated phase and the third calibrated phase;

determine a third phase timing slope between the second calibrated phase and the third calibrated phase;

determine a fit slope between the first, second, and third phase timing slopes; and perform joint transmission from the first TRP and the second TRP based on the determined fit slope.

8. The network entity of claim 1, wherein the first band separation between the first calibrated phase the second calibrated phase is a number of resource blocks between the first calibrated phase and the second calibrated phase.

9. A method performed by a network entity, the method comprising:

determining a target timing mismatch for a phase timing slope between a first channel state information-reference signal (CSI-RS) resource and a second CSI-RS resource;

determining, based on the target timing mismatch, a first band separation between a first calibrated phase for the first CSI-RS resource and the second CSI-RS resource and a second calibrated phase for the first CSI-RS resource and the second CSI-RS resource;

determining a first frequency band for the first calibrated phase;

determining, based on the first band separation, a second frequency band for the second calibrated phase;

determining, based on the first band separation between the first calibrated phase the second calibrated phase, a first phase timing slope between the first CSI-RS resource and the second CSI-RS resource; and performing joint transmission from a first transmit-receive point (TRP) and a second TRP based on the first phase timing slope.

10. The method of claim 9, further comprising:

determining a resource block (RB) phase granularity between the first calibrated phase and the second calibrated phase; and determining a target calibration error for the first calibrated phase and the second calibrated phase, wherein the first band separation is determined based on the RB phase granularity and the target calibration error.

11. The method of claim 9, further comprising:

determining whether the absolute value of a phase difference between the second calibrated phase and the first calibrated phase exceeds a phase threshold; and if the phase threshold is exceeded, determining the first phase timing slope based on an unwrapping of the second calibrated phase.

12. The method of claim 9, further comprising determining, based on the target timing mismatch, a bandwidth for the first CSI-RS resource and the second CSI-RS resource, wherein the bandwidth is determined to reduce a number of phase wraparounds between the first CSI-RS resource and the second CSI-RS resource.

13. The method of claim 12, wherein the bandwidth for the first CSI-RS resource is a number of resource blocks within the first CSI-RS resource, and the bandwidth for the second CSI-RS resource is a number of resource blocks within the second CSI-RS resource.

14. The method of claim 13, wherein the bandwidth is less than a maximum number of resource blocks within one phase ramp.

15. The method of claim 9, further comprising:

determining, based on a target bandwidth, a second band separation between the first calibrated phase and a third calibrated phase for the first CSI-RS resource and the second CSI-RS resource;

determining, based on the second band separation, a third frequency band for the third calibrated phase;

determining a second phase timing slope between the first calibrated phase and the third calibrated phase;

determining a third phase timing slope between the second calibrated phase and the third calibrated phase;

determining a fit slope between the first, second, and third phase timing slopes; and performing joint transmission from the first TRP and the second TRP based on the determined fit slope.

16. The method of claim 9, wherein the first band separation between the first calibrated phase the second calibrated phase is a number of resource blocks between the first calibrated phase and the second calibrated phase.

17. A non-transitory computer readable medium embodying a computer program, the computer program comprising program code that, when executed by a processor of a device, causes the device to:

determine a target timing mismatch for a phase timing slope between a first channel state information-reference signal (CSI-RS) resource and a second CSI-RS resource;

determine, based on the target timing mismatch, a first band separation between a first calibrated phase for the first CSI-RS resource and the second CSI-RS resource and a second calibrated phase for the first CSI-RS resource and the second CSI-RS resource;

determine a first frequency band for the first calibrated phase;

determine, based on the first band separation, a second frequency band for the second calibrated phase;

determine, based on the first band separation between the first calibrated phase the second calibrated phase, a first phase timing slope between the first CSI-RS resource and the second CSI-RS resource; and perform joint transmission from a first transmit-receive point (TRP) and a second TRP based on the first phase timing slope.

18. The non-transitory computer readable medium of claim 17, wherein the computer program further comprises computer readable program code that, when executed by the processor, causes the device to:

determine a resource block (RB) phase granularity between the first calibrated phase and the second calibrated phase;

determine a target calibration error for the first calibrated phase and the second calibrated phase;

determine whether the absolute value of a phase difference between the second calibrated phase and the first calibrated phase exceeds a phase threshold; and if the phase threshold is exceeded, determine the first phase timing slope based on an unwrapping of the second calibrated phase, wherein the first band separation is determined based on the RB phase granularity and the target calibration error.

19. The non-transitory computer readable medium of claim 17, wherein the computer program further comprises computer readable program code that, when executed by the processor, causes the device to:

determine, based on the target timing mismatch, a bandwidth for the first CSI-RS resource and the second CSI-RS resource, wherein the bandwidth is determined to reduce a number of phase wraparounds between the first CSI-RS resource and the second CSI-RS resource.

20. The non-transitory computer readable medium of claim 17, wherein the computer program further comprises computer readable program code that, when executed by the processor, causes the device to:

determine, based on a target bandwidth, a second band separation between the first calibrated phase and a third calibrated phase for the first CSI-RS resource and the second CSI-RS resource;

determine, based on the second band separation, a third frequency band for the third calibrated phase;

determine a second phase timing slope between the first calibrated phase and the third calibrated phase;

determine a third phase timing slope between the second calibrated phase and the third calibrated phase;

determine a fit slope between the first, second, and third phase timing slopes; and perform joint transmission from the first TRP and the second TRP based on the determined fit slope.

* * * * *